(12) United States Patent
Lindros

(10) Patent No.: US 7,942,157 B2
(45) Date of Patent: May 17, 2011

(54) CLEANING HEAD

(75) Inventor: Aleksander Lindros, Copenhagen (DK)

(73) Assignee: Alfa Laval Tank Equipment A/S, Ishoj (DK)

( * ) Notice: Subject to any disclaimer, the term of this patent is extended or adjusted under 35 U.S.C. 154(b) by 357 days.

(21) Appl. No.: 12/186,228

(22) Filed: Aug. 5, 2008

(65) Prior Publication Data

US 2009/0032073 A1  Feb. 5, 2009

Related U.S. Application Data

(63) Continuation-in-part of application No. PCT/DK2007/000062, filed on Feb. 6, 2007.

(51) Int. Cl.
B08B 3/12 (2006.01)
B08B 6/00 (2006.01)

(52) U.S. Cl. ..................... 134/176; 134/104.1

(58) Field of Classification Search .......... None
See application file for complete search history.

(56) References Cited

U.S. PATENT DOCUMENTS

| 3,637,138 | A | | 1/1972 | Rucker | |
| 3,912,503 | A | | 10/1975 | Schumacher et al. | |
| 5,333,630 | A | * | 8/1994 | Jepsen et al. | 134/104.1 |
| 2004/0240991 | A1 | * | 12/2004 | Bruce | 415/160 |

FOREIGN PATENT DOCUMENTS

| EP | 0557044 A | 8/1993 |
| JP | 05-195166 A | 8/1993 |
| JP | 07-251136 A | 10/1995 |
| JP | 10-317419 A | 12/1998 |
| WO | WO92/04994 A | 4/1992 |
| WO | WO2004/033950 A | 4/2004 |

OTHER PUBLICATIONS

Azomaterials, http://www.azom.com/details.asp?ArticleID=2382, made available: Feb. 18, 2004, date retrieved: Sep. 21, 2010.*
International Search Report.

* cited by examiner

Primary Examiner — Michael Barr
Assistant Examiner — Jason Y Ko
(74) Attorney, Agent, or Firm — William J. Sapone; Coleman Sudol Sapone P.C.

(57) ABSTRACT

In order to deliver supplies of liquid for irrigation of a cleaning head, a turnable part of the cleaning head housing and a nozzle hub (4) are mounted directly in a stationary part (2) of the housing to the turnable part (3) by forming slide bearings therebetween made of materials such as AISI316L and Nitronic60, preferably with at least one bearing having parts (15, 20) made of the same material. Liquid can flow through gaps (9, 14) provided between the slide bearing parts, reducing the consumption of liquid used for irrigating an exterior of the cleaning head, while creating a strong film of liquid which settles on the exterior surface.

10 Claims, 1 Drawing Sheet

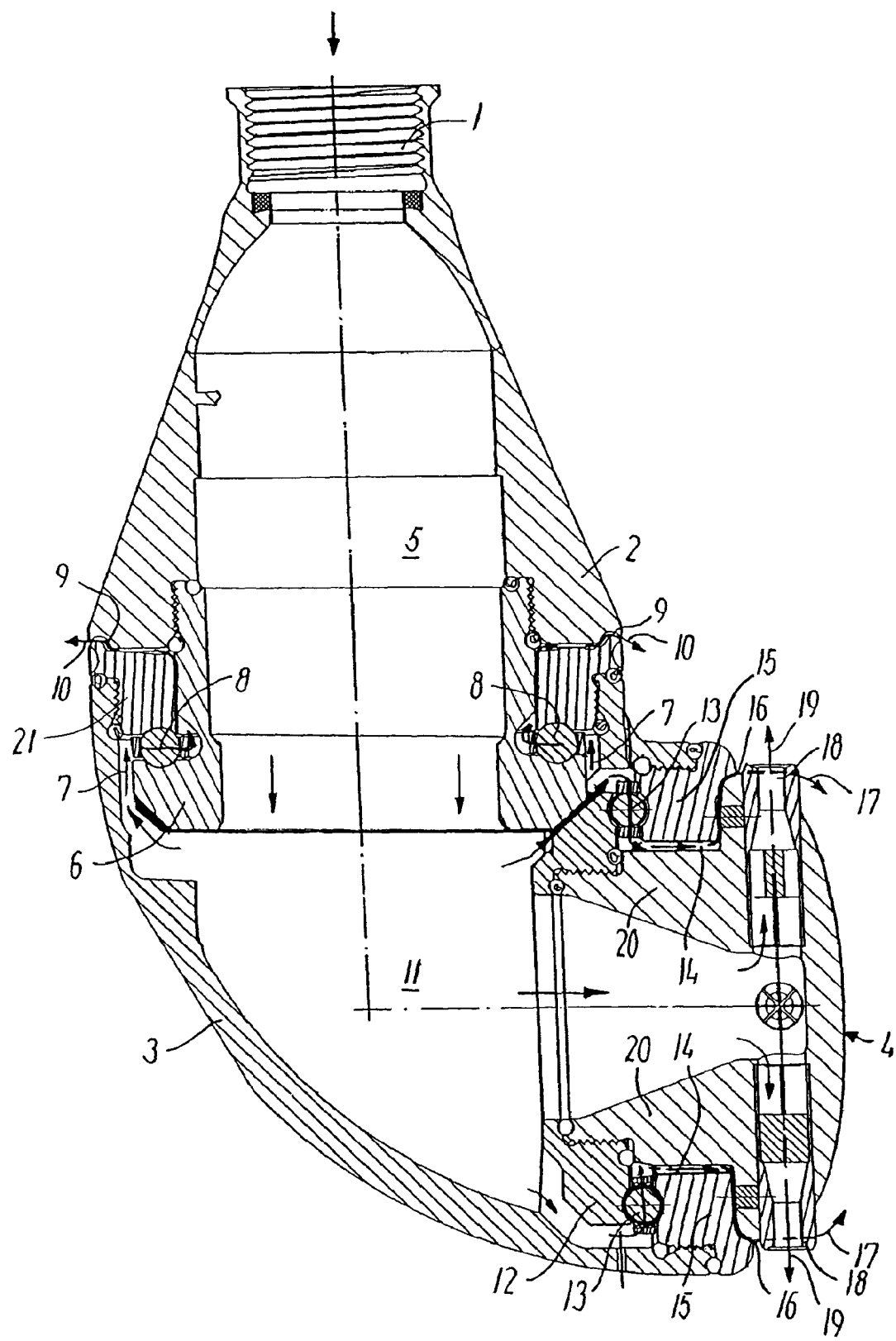

CLEANING HEAD

CROSS REFERENCE TO RELATED APPLICATIONS

This application is a continuation in part of PCT International Application no. PCT/DK2007/000062, filed Feb. 6, 2007.

BACKGROUND

The invention relates to a cleaning head, in particular to be mounted in a tank, the cleaning head comprising a stationary housing with an inlet for receiving cleaning liquid supplied under pressure as well as a housing turnably mounted on the stationary housing and having a nozzle hub provided with nozzles, wherein the housing with hub may be caused to turn at the same time as the nozzle hub is rotated, so that cleaning liquid for the cleaning of the internal side of the tank is ejected via the nozzles by the combined turning and rotating movement.

Cleaning heads of this type are preferably used for internal flushing and thereby cleaning of tanks of any type in the fields of transport and manufacture.

A good deal of cleaning liquid is used for keeping the parts of the cleaning housing clean, it being known to discharge cleaning liquids to the surface of the cleaning housing. To ensure that only the amount of liquid necessary for cleaning the surface is ejected, liquid restricting means, such as bushings, must be mounted. In case of wear, the flow of liquid becomes greater, which necessitates frequent replacement of the liquid restricting means.

In spite of the flushing of both the gears and bearings, it is not always possible to ensure the desired hygiene, since bearing parts, e.g., are often made of a polymeric material which may create a breeding ground for bacteriological contamination.

In addition, as a consequence of the mechanical elements, such as the turbine, gears and bearings, energy—i.e. liquid pressure—is consumed in order to overcome the friction in operation.

Thus, consumption of a large amount of energy is involved, for the operation as well as for insuring the desired hygiene.

THE OBJECT OF THE INVENTION

It is the object of the invention to remedy these defects and drawbacks of the known cleaning heads, and this is achieved in that the nozzle hub is mounted directly in a ring in the housing, the mount forming a slide bearing which allows a liquid flow for cleaning the exterior of the cleaning head. When the mount is configured such that it solely constitutes a combination of the bearing and a liquid passage for leading cleaning liquid through the bearing and out, a hygienic and liquid regulating mount is ensured in a surprisingly simple manner. This is ensured solely by the use of a slide bearing, and there is no need for additional restrictions, such as flow regulating rings.

When the turnable housing is mounted directly in the stationary housing by means of a slide bearing, good efficiency is achieved in a corresponding manner, as at the same time as the bearing is flushed, liquid is discharged to the outer surface of the housing.

When the liquid flow through the mount is allowed to pass through a gap or a channel, it is ensured that the discharged liquid irrigates and cleans the surfaces of the cleaning head in an effective manner.

When these liquid passages are dimensioned in a suitable manner, a liquid amount sufficient for the cleaning will be ensured.

When the bearing parts of the slide bearing are made of hard, corrosion resistant and wear resistant metals, such as AISI316L and Nitronic60, several advantages are achieved over the known bearing materials, which are frequently made of a polymeric material which presents a relatively soft bearing face.

Thus, it is ensured that the bearings have the same corrosion and temperature resistance as the rest of the cleaning head, just as the mount has the same temperature expansion coefficient, as well as a hard wear face, without any risk of bacterial growth.

This means that the bearings may be made with an unprecedentedly high degree of precision, which in turn provides for the possibility of controlling the liquid flow through the bearing. This ensures an unprecedented possibility for good operational economy, as the water consumption is reduced.

BRIEF DESCRIPTION OF THE DRAWING

An example of a cleaning head according to the invention will be described more fully below with reference to the drawing, which shows a sectional view of a cleaning head with plotted mounting of the rotary hub and of the housing.

DESCRIPTION OF AN EXEMPLARY EMBODIMENT

The cleaning head according to the invention comprises a stationary part 2, a turnable part 3 and a nozzle hub 4 mounted thereon. Cleaning liquid under pressure is supplied to the interior of the housing via an inlet channel 1.

Normally, the cleaning head will be immersed in the tank and be connected with the source of liquid by means of a pipe (not shown).

A turbine 5 (not shown) is mounted in the stationary housing part 2, the turbine generating a turning movement, which movement is transferred to the turnable part of the housing 3 via a gear 11 (not shown).

This turning movement causes turning of a toothed rim 6, which transfers the turning movement to a nozzle hub 4 via a toothed rim 12 mounted thereon.

The turning takes place on a slide bearing formed between the stationary housing 2 and a ring 21 of the turnable part of the housing 3. In addition, a ball bearing 8 is mounted.

The liquid, which is supplied to the turbine 5, is conveyed further on to the gear 11 and, via a channel 7, through the slide bearing and the ball bearing 8 to a channel 9, and is then discharged as an irrigation flow 10, thereby wetting the exterior of the housing 3 by generating a liquid film thereon.

The toothed rim 12 causes the nozzle hub 4 to rotate. This rotation takes place about a slide bearing which is provided between the hub 20 and a ring 15.

The slide bearing formed by the ring 15, and the hub 20 comprise bearing parts, which are preferably made of a metal alloy designated AISI316L and Nitronic60, respectively. This Nitronic60 contains about 8% magnesium, 4% silicon, 16% chromium and 8% nickel, and also additional elements, such as copper, molybdenum, titanium, columbium, vanadium and wolfram, all in all less than 0.1% of each individual element.

Using these alloys, a hard, corrosion resistant and wear resistant bearing is formed, and when the bearing is provided with a gap 14 between the parts, the gap may be dimensioned and the liquid flow thus be controlled such that it is discharged via a channel 16 to the rim area of the hub 4 to form an irrigation jet 17 to provide a liquid film on the surface of the hub, thereby cleaning the hub 4 in the most expedient manner with the lowest possible consumption of liquid.

The central liquid flow is conveyed to the cleaning nozzles 18, which eject cleaning jets 19 out against the sides of the tank.

The hub 4 is additionally provided with a bearing in the form of a ball bearing 13 to which liquid is supplied, said liquid subsequently passing through the gap 14 as a controlled liquid flow 17 via a further gap 16 between the gear housing 3 and the hub 4, so that the liquid channel 16 can irrigate the rim zone of the rotary hub 4 and also create a strong liquid film on the outer side of the hub 4.

Instead of the shown and described cleaning head, the invention may be performed on a cleaning head which is driven by a motor and a gear separated from the cleaning head itself, e.g. in that the driving equipment is mounted externally on the tank.

The invention claimed is:

1. A cleaning head to be mounted in a tank for cleaning an interior side thereof, said cleaning head comprising:
    a stationary housing (2) with an inlet for receiving cleaning liquid under pressure,
    a turnable housing (3) turnably mounted on said stationary housing,
    a nozzle hub (4) provided on the turnable housing, the nozzle hub provided with nozzles (18), a ball bearing (13) disposed between the nozzle hub (4) and the turnable housing (3), the turnable housing (3) with the nozzle hub (4) being caused to turn at the same time as the nozzle hub (4) is rotated relative to the turnable housing, such that cleaning liquid for the cleaning of the internal side of the tank is ejected via the nozzles (18) by the combined turning and rotating movement of both the turnable housing and the nozzle hub, the nozzle hub (4) being mounted directly in a ring (15) provided in the turnable housing (3), a slide bearing (15, 20) formed between opposed surfaces of the ring and nozzle hub, spaced away from the ball bearing (13), such that as the nozzle hub rotates relative to the ring, a liquid flow passing therebetween flushing passes through the ball bearing (13) then flushes the slide bearing before and then being discharged for cleaning an exterior of the cleaning head.

2. The cleaning head according to claim 1 wherein the turnable housing (3) is mounted directly in the stationary housing (2), a slide bearing formed therebetween, a liquid flow passing through the slide bearing for cleaning an exterior of the cleaning head.

3. The cleaning head according to claim 2 further comprising a flow channel (7) leading from an interior of the turnable housing (3) to a bearing channel (9) provided in the slide bearing for of discharging a liquid (10) to an exterior of the cleaning head.

4. The cleaning head according to claim 1 further comprising a bearing gap (14) formed between the ring and the nozzle hub through which the cleaning liquid flows, said liquid being supplied to a bearing channel (16) and discharged therefrom to a rim area of the nozzle hub (4) in the form of an irrigation jet (17).

5. The cleaning-head according to claim 3 wherein the flow channel and bearing channel (7, 9) are dimensioned so as to discharge an amount of liquid (17) necessary for irrigation of the cleaning head (3).

6. The cleaning-head according to claim 4 wherein the bearing gap (14) is dimensioned so as to discharge an amount of liquid necessary for irrigation of the turnable hub (4).

7. The cleaning head according to claim 1 wherein at least one of the ring (15) and hub (20) which form the slide bearing are made of a hard, corrosion resistant and wear resistant material.

8. The cleaning head according to claim 1 wherein the ring (15) and hub (20) which form the slide bearing are each made of a material selected from the group consisting of AISI316L, Nitronic6O and combinations thereof.

9. The cleaning head according to claim 7 wherein the ring (15) and hub (20) which form the slide bearing are made of different materials.

10. The cleaning head according to claim 8 wherein the ring (15) and hub (20) which form the slide bearing are made of the same material.

* * * * *